April 5, 1960  J. G. THEW  2,931,102
SUN DIAL
Filed Aug. 8, 1957

INVENTOR.
JOHN GARRET THEW
BY
ATTORNEY

2,931,102
SUN DIAL

John Garret Thew, Westport, Conn.

Application August 8, 1957, Serial No. 677,105

2 Claims. (Cl. 33—62)

This invention relates to a sun dial device in which a semi-circular gnomon or shadow structure is utilized to produce horological indications on an associated target.

The invention has several objects among which are the provision of a conveniently readable sun dial device which, in addition, may be read at a glance from relatively great distances; the provision of a sun time reading device which is readily adjustable to a location in a given time belt or area and to artificial changes in time; the provision of an easily installed, readily adjustable unit, the use of which is not unduly interfered with by deposits of ice or snow; and the provision of a sun time reader which produces horological indications not unduly distorted by the inclination of the sun's rays. These and other objects will be readily apparent from the following description of the invention, as illustrated by the accompanying drawings in which:

Figure 1:
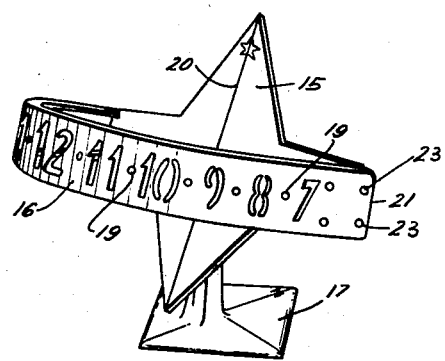
Fig. 1 shows in perspective view a sun dial unit embodying the invention.

The device shown in Fig. 1 is the presently preferred device and is the presently commercial form of this invention. Its purely design aspects from the point of view of appearance are not the subject of this application but are shown and claimed in my copending application for a sun dial design Serial No. D. 47,273, filed concurrently herewith.

The sun dial devices of this invention includes two essential parts, a target such as 15, and a gnomon shadow structure such as 16. The assembly of these two parts is conveniently mounted on a base of some shape such as the base 17 and, in the preferred form, the assembly is pivotally mounted on said base 17, for instance on the axle 18, so that the assembly may be inclined to face the target surface at such angle to the vertical as may be convenient to the latitude in which the installed sun dial is located. The size, shape or configuration of the base forms no part of this invention and it will be apparent that the base may be of any configuration or may even be eliminated. Likewise the pivoting arrangement between the base and the assembly of target and gnomon as a mere convenience may be dispensed with, since the desired degree of inclination to the vertical may be obtained by any mounting shaped to present the target surface at the desired angle.

Figure 4:
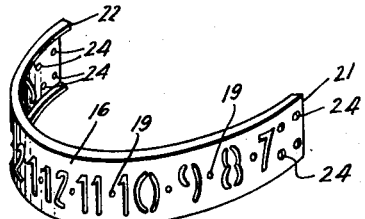
Fig. 4 is a plan view of a gnomon of the device of Fig. 1.
Figure 5:
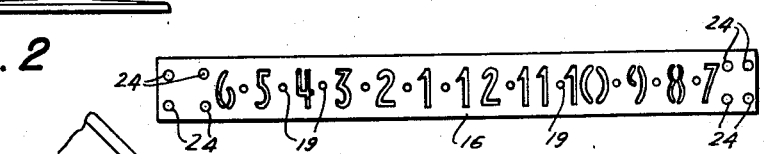
Fig. 5 is a strip view of the gnomon shown in Fig. 4, the curvature of said gnomon having been eliminated for the purpose of illustration.
Figure 3:
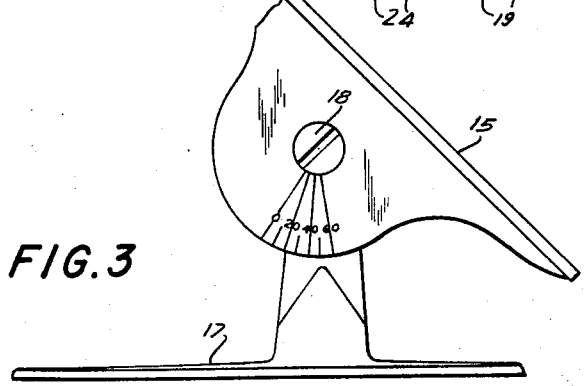
Fig. 3 is an enlarged view of a portion of the parts shown in Fig. 2.

Turning now to the assembly of the target 15 and the gnomon 16 these parts are preferably made of a durable material such as metal or plastic. The gnomon 16 is a strip-like band or structure which has the curvature of a circle throughout its length and which is adapted to be fixed with respect to the target 15. The strip-like structure of the gnomon 16 is so constructed that portions thereof are relatively opaque as respect to other portions so that the sun's rays pass more readily through some areas than through others. In the device illustrated this is achieved by forming in the strip-like curved gnomon a plurality of perforations in the shape of the characteristic horological symbols or marks 6, 5, 4, 3, 2, 1, 12, 11, 10, 9, 8, 7 as shown in Figs. 1, 4 and 5. Thus when the sun's rays strike the gnomon, the shadow of the opaque or solid portions of the gnomon band is cast to define the arabic symbols of the hours of the day. The same result would be obtained were the gnomon strip so perforated that the opaque portion thereof took the shape of the desired symbols. The choice of shape of perforations is obviously one of mechanical expediency and ease of manufacture. Likewise, if desired, the gnomon strip may contain no perforations and be composed of suitably shaped areas of differing relative opaqueness such as may be formed by a combination of metal and glass or a clear resin and a more opaque resin. Such latter forms are not ordinarily preferred since accumulations of dirt, snow or ice on the less opaque portions will interfere with the sharpness and intensity of the resulting shadow.

On the gnomon strip illustrated in the drawing, the perforations 19 are located intermediate the centers of the perforations shaped as numbers in order to provide that the shadow of the gnomon will designate half hours as well as full hours.

The target 15 is so mounted as respects the gnomon 16 that it receives on its surface shadows cast by the passage of the sun's rays through the gnomon. The target 15 is so positioned radially of the gnomon shadow structure as to contain on its shadow receiving surface the center, or the approximate center, of the circle, the curvature of which is defined by the curvature of the gnomon strip. As shown, the surface of the target 15 is conveniently flat but it may have curvature so long as the center of the target surface contains the center, or approximate center of a circle having the curvature of the gnomon shadow band. Conveniently and for accuracy and ease of readings of time, the shadow receiving surface of the target 15 has marked thereon the center line 20 of that surface (see Fig. 1). This center line includes the center of curvature of the gnomon and is approximately perpendicular to the diameter of the circle, a portion of which is defined by the gnomon curvature. That portion of the target surface which contains, or desirably would contain, this center line 20 is preferably so extended in the direction of that line as to provide a target area for the receiving shadow cast by the gnomon at any time of the year despite the declination of the sun. Preferably, therefore, the target area is so extended in the direction of its center line 20, as best indicated in Fig. 1, that it will receive at the center line a shadow cast by the sun as the sun's declination varies, plus or minus, about 23 degrees from the equinox.

In order to provide reasonably accurate readings of time, the perforations in the gnomon are so arranged that the centers of the main horological marks defined therein are at spacings of 15 degrees along the curved surface of the gnomon.

Figure 2:
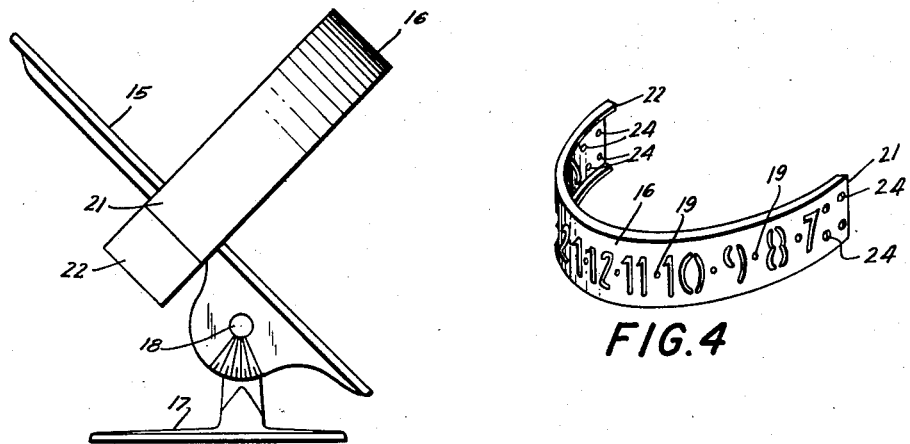
Fig. 2 shows a side view of the device shown in Fig. 1, the horological symbols of the gnomon being omitted.

A desirable feature is the provision of a gnomon band or strip of such length that it defines, over its curved length, more than 180 degrees of the circle to which its curvature corresponds. Thus, when the gnomon is fixed to the target structure 15 its ends 21, 22 extend beyond the point of fixation, as best shown in Fig. 2. With this construction it is therefore mechanically possible to adjustably rotate the gnomon 16 in respect of the target 15 to accurately adjust for distance from a reference point in a standard time belt or to adjust for seasonal changes from standard time to so-called "daylight savings time" or other such artificial changes. In the illustrated embodiment of my invention the attachment of the gnomon to the target is by means of screws 23 (see Fig. 1) passing through holes 24 provided therefor at each end of the curved gnomon. In this embodiment four holes 24 have been provided in pairs at each end of the gnomon (see Figs. 4 and 5), and each pair is so spaced as to provide for the seasonal adjustment to and from "daylight" time commonly used in portions of the eastern time belt of the United States of America. If time accuracy is desirable, a number of screw holes such as 24 may be provided or slots of a length may be used as will permit all adjustments necessary throughout a time belt for extreme accuracy.

Another desirable feature of this invention is the shaping of the shadow producing portions of the curved gnomon to compensate for lateral distortion of the shadow the horological symbol which is cast on or near the center line of the target surface. This is achieved in the illustrated form of the invention by progressively reducing the lateral width of the perforations defining the horological symbols according to the distance of their location from the symbol, the shadow of which is most nearly bisected by the center line of the target area at the time when the sun has reached its meridian. As indicated in the drawings, particularly Fig. 5, the width of the numbers defined by the perforated portions of the gnomon decreases to both right and left of the number 12. This minimizes distortion when the sun lies low in the early morning and late afternoon with the result that the shadow of a numeral cast on the target surface center line throughout the day is approximately of the same width.

In the use of a sun dial device embodying my invention the target 15 is first mounted so that the target surface is at an angle to the vertical. This may be done by fixing the target to any convenient base, or if a base be provided and pivotably connected to the target by pivotally adjusting the target in respect of the base according to latitude. The arcuate gnomon is then fixed to the target and over the surface thereof in such position that the center of the circle partially defined by curvature of the gnomon band is at or approximately at the target surface and so that, at a given hour, the shadow of the horological mark designating that hour is approximately bisected by a line including said circle center and perpendicular to the plane of the circle.

In the description of this invention reference has been had to circles, circle centers, curvature and other spatial and shape relationships. While these have been expressed by terms which are mathematically absolute in character it will be realized that minor deviations therefrom are permissible where absolute accuracy is not the result desired. Thus considerations of cost, of manufacture and of ordinary use of the sun dial devices constructed in accordance with this invention may perforce, or desirably, cause deviations from absolute spatial and shape relationships which do not essentially impair either the principles of this invention or the principal advantages to be derived from the use of sun dials constructed in substantial compliance with such principles.

What I claim is:

1. In a sun dial, in combination, an arcuate band-like gnomon shadow structure having the curvature of a circle and embodying relatively opaque portions shaped to cast shadows of a plurality of spaced horological marks, in which structure the light transmitting areas defined by said opaque areas are adjusted in decreasing widths from a point intermediate the ends of the gnomon towards each end thereof, and a target normally fixedly positioned in respect of said gnomon to present within the curvature of the gnomon a shadow-receiving area, one point of which substantially corresponds to the center of said circle, the target being so shaped as to receive on said area at least that portion of the gnomon shadow which falls adjacent said circle center and adjacent to points directly above and below said center as measured along said area, whereby the width of a horological mark defined by the shadow of the gnomon cast in said target area adjacent the center of said circle and adjacent to points directly above and below said center remains relatively constant and substantially independent of the position of the sun.

2. In a sun dial, in combination, a target having a substantially flat light diffusing target surface, means for adjustably mounting said target to enable adjustment of said target surface with respect to the rays of the sun, and an arcuate band-like gnomon shadow structure having the curvature of a circle and embodying relatively opaque portions shaped to cast shadows of a plurality of spaced horological marks, said gnomon being normally fixedly positioned with respect of said target so that the plane of the circle partially defined by said gnomon is perpendicular to the plane of the center of said target surface and so that the center of said surface substantially corresponds to the center of said circle, the target surface being so positioned as to receive at least that portion of the gnomon shadow which falls adjacent said circle center and adjacent to points directly above and below said center as measured along said surface.

References Cited in the file of this patent

UNITED STATES PATENTS

| | | |
|---|---|---|
| 196,550 | Anderson | Oct. 30, 1877 |
| 2,884,697 | Sylvester | May 5, 1959 |

FOREIGN PATENTS

| | | |
|---|---|---|
| 14,338 | Denmark | Mar. 13, 1911 |
| 370,510 | Great Britain | Apr. 14, 1932 |